United States Patent
Guo et al.

(10) Patent No.: US 8,917,613 B2
(45) Date of Patent: Dec. 23, 2014

(54) METHOD AND DEVICE FOR TRANSMITTING KEEPALIVE INFORMATION

(75) Inventors: Fangfu Guo, Shanghai (CN); Dingzhang Dai, Shanghai (CN); Yongqiang Gao, Beijing (CN); Dong Chen, Shanghai (CN); Yanyan Chen, Beijing (CN); Xiaoxiao Zheng, Shanghai (CN); Li Feng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 13/566,466

(22) Filed: Aug. 3, 2012

(65) Prior Publication Data

US 2012/0294157 A1    Nov. 22, 2012

Related U.S. Application Data

(63) Continuation of application No. PCT/CN2010/079877, filed on Dec. 26, 2010.

(30) Foreign Application Priority Data

Feb. 5, 2010    (CN) .......................... 2010 1 0108604

(51) Int. Cl.
H04L 12/26    (2006.01)
(52) U.S. Cl.
CPC ...................................... H04L 43/10 (2013.01)
USPC .......................................................... 370/251
(58) Field of Classification Search
CPC ....... H04L 43/00; H04L 67/141; H04L 67/14; H04L 65/1006; H04L 43/10; H04W 52/0225
USPC .................... 370/251; 455/453, 450; 709/223
See application file for complete search history.

(56) References Cited

U.S. PATENT DOCUMENTS

| | | | | |
|---|---|---|---|---|
| 2007/0060153 | A1* | 3/2007 | Torsner et al. | 455/450 |
| 2007/0259673 | A1* | 11/2007 | Willars et al. | 455/453 |
| 2008/0039032 | A1 | 2/2008 | Haumont | |
| 2009/0201857 | A1* | 8/2009 | Daudin et al. | 370/328 |

FOREIGN PATENT DOCUMENTS

| | | |
|---|---|---|
| CN | 1918923 | 2/2007 |
| CN | 1984008 | 6/2007 |
| CN | 101155413 | 4/2008 |
| CN | 101438612 | 5/2009 |
| EP | 1622400 | 2/2006 |
| WO | 2011/085802 | 7/2011 |

OTHER PUBLICATIONS

Extended European Search Report issued Oct. 10, 2012 in corresponding European Patent Application No. 10845120.4.

(Continued)

*Primary Examiner* — Jung Park
*Assistant Examiner* — Albert Shih
(74) *Attorney, Agent, or Firm* — Staas & Halsey LLP

(57) ABSTRACT

The present invention provides a method for transmitting keepalive information, a terminal, and a network device. The method includes: transmitting, by a terminal, first information to a network device, where the first information is used to instruct the network device to determine keepalive information to be received; the terminal transmits keepalive information to the network device, where the network device is configured to optimize the keepalive information. With the present invention, signaling loads are reduced.

21 Claims, 8 Drawing Sheets

(56) References Cited

OTHER PUBLICATIONS

Written Opinion of the International Searching Authority issued Mar. 31, 2011 in corresponding International Patent Application No. PCT/CN2010/079877.

Huawei Technologies Co., Ltd., "Traffic Volume Measurement for Cell_PCH UE", 3GPP TSG RAN WG2 #61, Feb. 2008, 4 pages.

"3$^{rd}$ Generation Partnership Project; Technical Specification Group Radio Access Network; Radio Resource Control (RRC); Protocol Specification (Release 8)", 3GPP TS 25.331 V8.8.0, Sep. 2009, pp. 206-210, 519-522 (1,697 pages total).

Chinese Office action mailed Dec. 5, 2012 in corresponding Chinese Application No. 201010108604.X.

International Search Report of PCT/CN2010/079877 mailed Mar. 31, 2011.

Chinese Office Action dated Sep. 16, 2014 in Chinese Patent Application No. 201010108604.X.

\* cited by examiner

METHOD AND DEVICE FOR TRANSMITTING KEEPALIVE INFORMATION

CROSS-REFERENCE TO RELATED APPLICATIONS

This application is a continuation of International Application No. PCT/CN2010/079877, filed on Dec. 16, 2010, which claims priority to Chinese Patent Application No. 201010108604.X, filed on Feb. 5, 2010, both of which are hereby incorporated by reference in their entireties.

FIELD OF THE INVENTION

The present invention relates to mobile communication technologies, and in particular, to a method, a terminal, and a network device for transmitting keepalive information.

BACKGROUND OF THE INVENTION

For a user equipment (User Equipment, UE) that activates services such as Email push, MSN, QQ, and virtual private network (Virtual Private Network, VPN) to maintain a connection with an application server within a time period when no service data occurs, keepalive (keep alive) information or heart beat (heart beat) information needs to be exchanged with the application server. The features of keepalive information are small data packets and frequent transmission.

In the prior art, the keepalive information is processed in a manner same as that of processing ordinary data. The UE needs to initiate a radio resource control (RRC) connection setup process or a cell update process each time when the keepalive information is transmitted. Because the keepalive information is frequently transmitted, the UE also needs to initiate the above process frequently.

Therefore, signaling loads are heavy.

SUMMARY OF THE INVENTION

Embodiments of the present invention provide a method, a terminal, and a network device for transmitting keepalive information to reduce signaling loads.

In one respect, the present invention provides a method for transmitting keepalive information, including:

transmitting, by a terminal, first information to a network device, where the first information is used to instruct the network device to determine keepalive information to be received; and transmitting, by the terminal, the keepalive information to the network device, where the network device is configured to optimize the keepalive information.

In another respect, the present invention provides a method for transmitting keepalive information, including:

receiving, by a network device, first information transmitted from a terminal, and determining, according to the first information, keepalive information to be received; and receiving, by the network device, keepalive information transmitted from the terminal, and optimizing the keepalive information.

In another respect, the present invention provides a terminal, including:

a first transmission unit, configured to transmit first information to a network device, where the first information is used to instruct the network device to determine keepalive information to be received; and a second transmission unit, configured to transmit keepalive information to the network device, where the network device is configured to optimize the keepalive information.

In another respect, the present invention provides a network device, including:

a determination unit, configured to receive first information transmitted from a terminal, and determine keepalive information to be received according to the first information; and a processing unit, configured to receive keepalive information transmitted from the terminal, and optimize the keepalive information.

According to the above technical solutions, in embodiments of the present invention, the first information is transmitted to the network device, and the network device may know, according to the first information, that keepalive information is transmitted, so as to optimize the keepalive information.

BRIEF DESCRIPTION OF THE DRAWINGS

To make the technical solutions according to embodiments of the present invention clearer, the accompanying drawings for illustrating the embodiments of the present invention are described below. Evidently, the accompanying drawings are exemplary only, and those skilled in the art may derive other drawings from such accompanying drawings without any creative effort.

DETAILED DESCRIPTION OF THE EMBODIMENTS

For a better understanding of the objectives, technical solutions, and merits of the present invention, the present invention is described as follows in detail with reference to the accompanying drawings. It is evident that the embodiments are only exemplary embodiments of the present invention, rather than all embodiments. All other embodiments that those skilled in the art obtain based on embodiments of the present invention also fall in the scope of the present invention.

Figure 1:
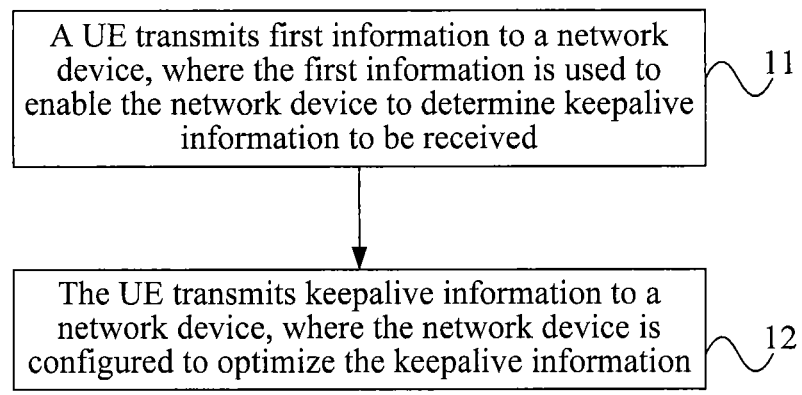
FIG. 1 is a schematic flow chart of a method for transmitting keepalive information according to an embodiment of the present invention.

FIG. 1 is a schematic flow chart of a method for transmitting keepalive information according to an embodiment of the present invention. The method includes the following:

11: A UE transmits first information to a network device, where the first information is used to instruct the network device to determine keepalive information to be received.

For example, the first information may be a keepalive information indication, a traffic volume indication, and a traffic volume. Details are as follows.

For example, a non-access stratum (Non-Access Stratum, NAS) (that is, a higher layer) of the UE may instruct an access stratum (Access Stratum, AS) to transmit the keepalive information; after the AS receives a primitive indication transmitted from the NAS, the AS may transmit a keepalive information indication to a radio network controller (Radio Network Controller, RNC) by using a radio resource control (Radio Resource Control, RRC) connection request (RRC CONNECTION REQUEST) message or a cell update (CELL UPDATE) message or other messages. The RNC may determine, according to the keepalive information indication, that keepalive information is to be received subsequently.

In another embodiment of the present invention, the UE may receive a traffic volume report triggering criterion, where the traffic volume report triggering criterion includes a first threshold and a second threshold; when a traffic volume measurement result measured by the UE ranges between the first threshold and the second threshold (boundary values may be included), the UE transmits a traffic volume indication indicating the keepalive information to be received by the network device. The RNC may know, according to the traffic volume indication, that the keepalive information is to be received subsequently.

In another embodiment of the present invention, the UE may directly transmit measured traffic volume to the RNC, and the RNC judges whether information to be received is keepalive information according to a traffic volume report triggering criterion configured by the RNC, where the traffic volume report triggering criterion includes a first threshold and a second threshold. When the traffic volume reported by the UE ranges between the first threshold and the second threshold (boundary values may be included), the RNC knows that the keepalive information is to be received subsequently.

In another embodiment of the present invention, the UE may receive a traffic volume report triggering criterion, where the traffic volume report triggering criterion includes a first threshold; when the traffic volume measured by the UE is greater than or equal to the first threshold, the UE transmits a traffic volume measurement result to the RNC; the RNC preconfigures a second threshold; when the traffic volume measurement result received by the RNC is smaller than or equal to the second threshold, the RNC determines that keepalive information is to be received.

12: The UE transmits the keepalive information to the network device, where the network device is configured to optimize the keepalive information.

For example, the optimization may be performed before the keepalive information is transmitted and/or after the keepalive information is transmitted. That is, the optimization may be performed only before the keepalive information is transmitted or only after the keepalive information is transmitted; or before the keepalive information is transmitted and after the keepalive information is transmitted.

For example, in an RRC connection setup process or a cell update process before the keepalive information is transmitted, the RNC may instruct the UE to enter a cell_forward access channel (CELL_FACH) state. In this case, a radio link of the Iub interface (an interface between an RNC and a base station) does not need to be set up; when the Iur interface (an interface between RNCs) exists, the radio link of the Iur interface does not need to be set up either, thus reducing signaling loads.

In another embodiment of the present invention, after the keepalive information is transmitted, the RNC instructs the UE to enter a cell_paging channel (CELL_PCH) state or a Universal Terrestrial Radio Access Network (UTRAN) registration area_paging channel (URA_PCH) state. In this case, when the UE retransmits keepalive information, the radio link of the Iu interface (an interface between an RNC and a core network (Core Network, CN)) does not need to be set up, thus reducing signaling loads.

Certainly, it may be understood that the indication type and optimization processing manner are examples only, and are not limited to the above description.

In this embodiment, the first information is transmitted to the network device, and the network device may know, according to the first information, that keepalive information is to be received, so that the network device optimizes the keepalive information.

Figure 2:
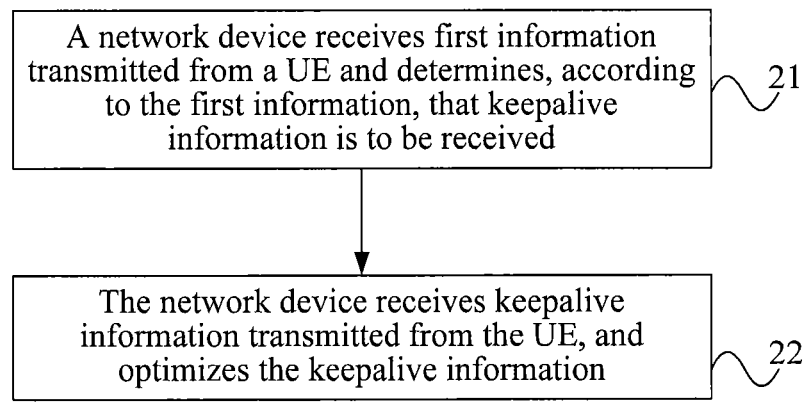
FIG. 2 is a schematic flow chart of a method for transmitting keepalive information according to another embodiment of the present invention.

FIG. 2 is a schematic flow chart of a method for transmitting keepalive information according to an embodiment of the present invention. The method includes the following:

21: A network device receives first information transmitted from a UE and determines, according to the first information, that keepalive information is to be received.

The network device may be an RNC or other core network devices, for example, an SGSN.

22: The network device receives keepalive information transmitted from the UE, and optimizes the keepalive information.

The first information may be a keepalive information indication, a traffic volume indication, and a traffic volume measurement result.

Specifically, the optimization processing may be specifically as follows: In an RRC connection setup process or a cell update process before the keepalive information is transmitted, the RNC may instruct the UE to enter a cell_forward access channel (CELL_FACH) state. In this case, a radio link of the Iub interface (an interface between an RNC and a base station) does not need to be set up; when the Iur interface (an interface between RNCs) exists, the radio link of the Iur interface does not need to be set up either, thus reducing signaling loads.

In another embodiment of the present invention, the optimization processing may be as follows: After keepalive information is transmitted, the RNC instructs the UE to enter a cell_paging channel (CELL_PCH) state or a UTRAN registration area_paging channel (URA_PCH) state. In this case, when the UE retransmits the keepalive information, the radio link of the Iu interface (an interface between an RNC and a core network (Core Network, CN)) does not need to be set up, thus reducing signaling loads.

In another embodiment of the present invention, both the above optimization processing may be executed.

The details may be referred to Embodiment 1, which are not further described.

In this embodiment, the first information is received, and the network device may know, according to the first information, that keepalive information is to be received, so that the network device optimizes the keepalive information.

Figure 3:
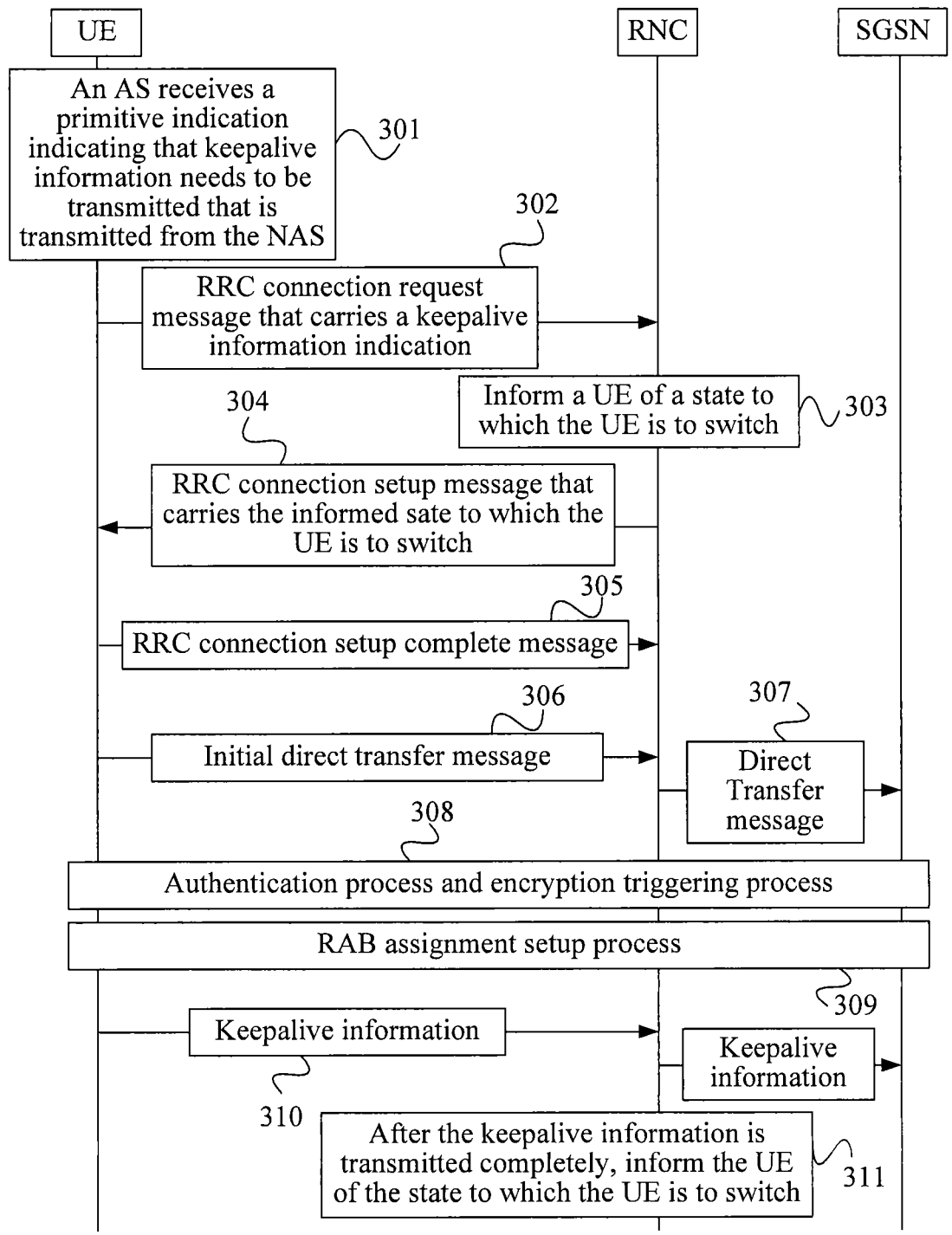
FIG. 3 is a schematic flow chart of a method for transmitting keepalive information according to another embodiment of the present invention.

FIG. 3 is a schematic flow chart of a method for transmitting keepalive information according to another embodiment of the present invention. This embodiment is based on the case where a UE in the idle state carries a keepalive information indication in an RRC connection request message. As shown in FIG. 3, the method may include the following:

301: For a UE in an idle (IDLE) state, an access stratum of the UE receives a primitive indication transmitted from a non-access stratum of the UE, where the primitive indication indicates that keepalive information needs to be transmitted.

302: The UE initiates an RRC connection setup process, and transmits an RRC connection request (RRC CONNECTION REQUEST) message to an RRC, where the RRC connection request message carries a keepalive information indication.

For example, the "establishment cause" ("Establishment cause") field of the RRC connection request message is set to the keepalive information indication, where the keepalive information indication includes, but is not limited to, a keepalive call (keepalive call).

303: After receiving the RRC Connection Request message, the RNC informs the UE of a state to which the UE is to switch.

For example, the RNC measures signaling load details of the network and the keepalive information indication, and may instruct the UE to switch to a state.

For example, when the signaling loads are heavy, the RNC may instruct the UE to enter a cell_forward access channel (CELL_FACH) state. In this case, the radio link of the Iub/Iur interface does not need to be set up. When the signaling loads are light, the RNC may instruct the UE to enter a cell_dedicated channel (CELL_DCH) state. A threshold value may be set on the RNC. When the signaling loads are greater than or equal to the threshold value, the signaling loads are heavy; when the signaling loads are smaller than the threshold value, the signaling loads are light. The specific threshold value may be set according to the actual requirement.

304: The RNC carries the informed state to which the UE is to switch in an RRC connection setup (RRC CONNECTION SETUP) message, and transmits the RRC connection setup message to the UE.

305: The UE returns an RRC connection setup complete (RRC CONNECTION SETUP COMPLETE) message to the RNC.

306: The UE initiates a radio access bearer (Radio Access Bearer, RAB) setup process, and transmits an initial direct transfer (Initial Direct Transfer) message to the RNC.

307: The RNC transmits a direct transfer (Direct Transfer) message to a serving general packet radio service (General Packet Radio Service, GPRS) support node (Serving GPRS Support Node, SGSN) of a CN.

308: The SGSN initiates an authentication process and an encryption triggering process.

309: The SGSN initiates an RAB assignment setup process.

For example, the process of initiating an RAB assignment setup process by the SGSN may include: an active PDP context request (Active PDP context Request), an RAB assignment request (RAB Assignment Request), a radio bearer setup (Radio bearer setup), a radio bearer setup complete (Radio bearer setup complete), an RAB assignment response (RAB Assignment Response), and an active Packet Data Protocol (PDP) context accept (Active PDP context Accept).

310: After RAB setup is completed, keepalive information begins to be transmitted through an established service bearer.

311: After keepalive information is transmitted completely, the RNC instructs the UE to switch to a proper state.

For example, if the current signaling loads are light, the RNC may instruct the UE to enter the idle state. If the current signaling loads are heavy, the RNC may instruct the UE to enter a cell_paging channel (CELL_PCH) state or a UTRAN registration area_paging channel (URA_PCH) state. In this case, when the UE retransmits the keepalive information, the Iu connection setup process does not need to be reinitiated, thus saving signaling overhead of the Iu interface.

The RNC may carry the informed state to which the UE is to switch in messages such as a radio bearer reconfiguration (RADIO BEARER RECONFIGURATION) message, and transmits the radio bearer reconfiguration message to the UE, and the UE enters a corresponding state according to the indication.

In this embodiment, the keepalive information indication is carried in the RRC connection setup message, so that the RNC may refer to the keepalive information indication when informing the UE of the state to switch to. In this way, the optimization may be implemented. In this embodiment, signaling loads may be reduced when the UE in the idle state transmits the keepalive information.

Figure 4:
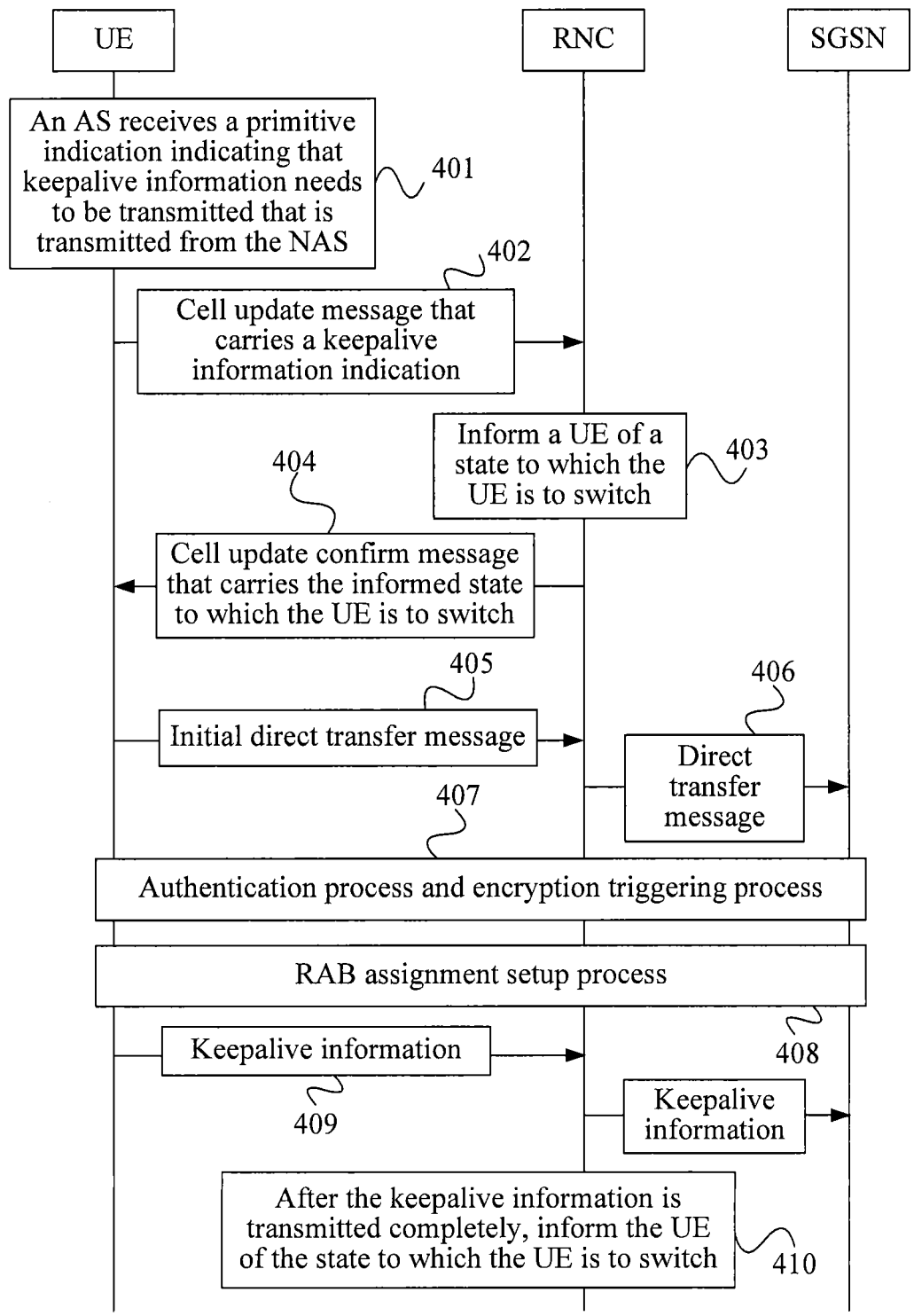
FIG. 4 is a schematic flow chart of a method for transmitting keepalive information according to another embodiment of the present invention.

FIG. 4 is a schematic flow chart of a method for transmitting keepalive information according to another embodiment of the present invention. This embodiment is based on the case where a UE in a CELL_PCH state or a URA_PCH state carries a keepalive information indication in a cell update (CELL UPDATE) message. As shown in FIG. 4, the method may include the following:

401: For a UE in the CELL_PCH state or the URA_PCH state, an access stratum of the UE receives a primitive indication transmitted from a non-access stratum of the UE, where the primitive indication indicates that keepalive information needs to be transmitted.

402: The UE initiates a cell update (Cell update) process, and transmits a cell update (CELL UPDATE) message to an RNC, where the cell update message carries a keepalive information indication.

For example, the "Establishment cause" field of the cell update message is set to a keepalive information indication that includes, but is not limited to, a keepalive call; or the cell update cause ("cell update cause") field of the cell update message is set to a keepalive information indication that includes, but is not limited to, keepalive data transmission (keepalive data transmission).

403: After receiving the cell update message, the RNC informs the UE of a state to which the UE is to switch.

For example, the RNC may instruct the UE to switch to a state according to signaling load details of the network and the keepalive information indication.

For example, when signaling loads are heavy, the RNC may instruct the UE to enter a cell_forward access channel (CELL_FACH) state. In this case, the radio link of the Iub/Iur interface does not need to be set up. When the signaling loads are light, the RNC may instruct the UE to enter a cell_dedicated channel (CELL_DCH) state.

404: The RNC carries the informed state to which the UE is to switch in a cell update confirm (Cell Update Confirm) message, and transmits the cell update confirm message to the UE.

405: The UE transmits an initial direct transfer (Initial Direct Transfer) message to the RNC.

406: The RNC transmits a direct transfer (Direct Transfer) message to an SGSN.

407: The SGSN initiates an authentication process and an encryption triggering process.

408: The SGSN initiates an RAB assignment setup process.

409: After RAB setup is completed, the keepalive information starts to be transmitted over an established service bearer.

410: After the keepalive information is transmitted, the RNC instructs the UE to switch to a proper state.

The above 405 to 410 may be referred to 306 to 311. The RNC may carry the informed state to which the UE is switched to in a radio reconfiguration (RADIO RECONFIGURATION) message or a transport channel reconfiguration (TRANSPORT CHANNEL RECONFIGURATION) message, and transmits the radio reconfiguration message or the transport channel reconfiguration message to the UE.

The UE switches to the state according to the state indicated by the RNC, and transmits messages such as a radio reconfiguration complete (RADIO RECONFIGURATION COMPLETE) message or a transport channel reconfiguration complete (TRANSPORT CHANNEL RECONFIGURATION CPMPLETE) message to the RNC.

In this embodiment, the keepalive information indication is carried in the cell update message, so that the RNC may refer to the keepalive information indication when informing the UE of the state to which the UE is to switch. In this way, the optimization may be implemented. In this embodiment, signaling loads may be reduced when the UE in the CELL_PCH state or the URA_PCH state transmits the keepalive information.

In FIG. 3 and FIG. 4, the UE determines to transmit the keepalive information according to an indication of a higher layer, or according to the actual traffic volume. For example, details are as follows.

Figure 5:
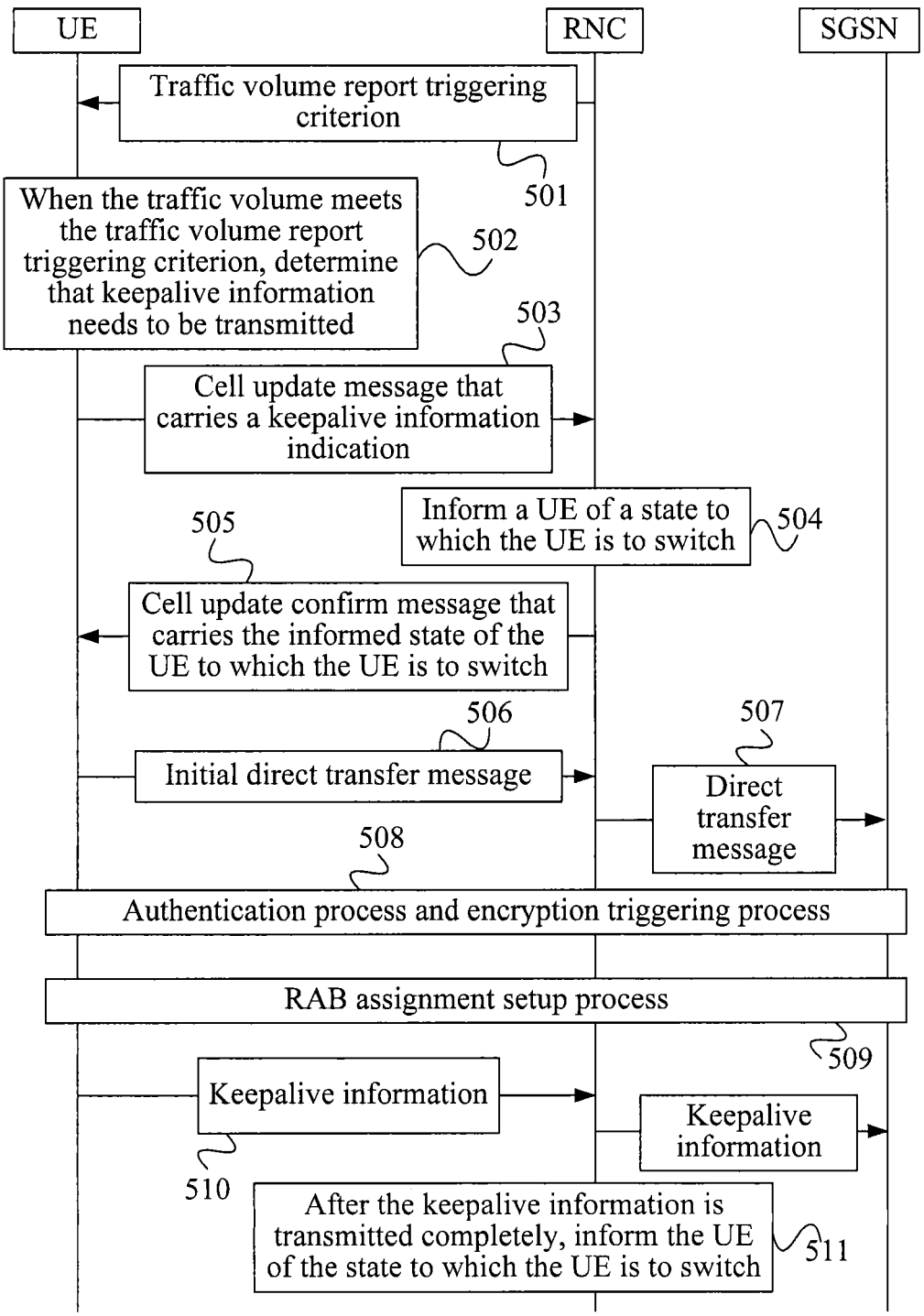
FIG. 5 is a schematic flow chart of a method for transmitting keepalive information according to another embodiment of the present invention.

FIG. 5 is a schematic flow chart of a method for transmitting keepalive information according to another embodiment of the present invention. The method includes the following:

501: An RNC delivers a traffic volume report triggering criterion to a UE.

For example, the RNC delivers the traffic volume report triggering criterion to the UE through an event 4c, where the event 4c may be carried in a system information block (SIB) 11 message, a SIB 11b message, a SIB 12 message or a Measurement control message. Certainly, the event 4c may be carried in messages other than the above messages.

For example, the event 4c may include a traffic volume threshold value, where the traffic volume threshold value may be a first threshold (threshold1) and a second threshold (threshold2). For example, the first threshold value and the second threshold value may be set according to the size of the keepalive information. In this way, when the traffic volume ranges between the first threshold value and the second threshold value, the keepalive information is transmitted.

502: When the traffic volume measured by the UE meets the traffic volume report triggering criterion, the UE determines that keepalive information needs to be transmitted.

For example, when the traffic volume ranges between the thresholds of the traffic volume report triggering criterion, the traffic volume meets the traffic volume report triggering criterion.

503: The UE initiates a cell update (Cell update) process, and transmits a cell update (CELL UPDATE) message to the RNC, where the cell update message carries a traffic volume indication.

For example, a "traffic volume indicator extension" field is added to the cell update message; when this field is true (true), the keepalive information is to be transmitted, and when this field is false, the keepalive information is not transmitted.

When the traffic volume measurement result does not range between the above threshold values, the "traffic volume indicator extension" field may be set to false (false), indicating that the information to be received by a network device is not the keepalive information, or the traffic volume indication is not to be transmitted, and vice versa.

In another embodiment of the present invention, when the field is 1, the keepalive information is to be transmitted; when the field is 0, the information to be received by the network device is not the keepalive information, and vice versa.

It may be understood that the UE may also carry the measured traffic volume in a cell update message and the RNC judges whether to transmit the keepalive information according to the traffic volume and the traffic volume report triggering criterion. In this case, the RNC does not need to deliver the traffic volume triggering criterion to the UE.

Alternatively, the traffic volume report triggering criterion delivered by the RNC to the UE includes a first threshold. Then, when the traffic volume measurement result measured by the UE is greater than or equal to the first threshold, the traffic volume measurement result is reported to the RNC; the RNC compares the traffic volume measurement result with a second threshold preconfigured on the RNC; when the traffic volume measurement result is smaller than or equal to the second threshold, the RNC determines that the keepalive information is to be received.

504: After receiving the Cell Update message, the RNC informs the UE of a state to which the UE is to switch.

505: The RNC carries the informed state to which the UE is to switch in a cell update confirm (Cell Update Confirm) message, and transmits the cell update confirm message to the UE.

506: The UE transmits an initial direct transfer (Initial Direct Transfer) message to the RNC.

507: The RNC transmits a direct transfer (Direct Transfer) message to an SGSN.

508: The SGSN initiates an authentication process and an encryption triggering process.

509: The SGSN initiates an RAB assignment setup process.

510: After RAB setup is completed, the keepalive information starts to be transmitted over an established service bearer.

511: After the keepalive information is sent, the RNC instructs the UE to switch to a proper state.

The above 504 to 511 may be referred to 403 to 410.

It may be understood that this embodiment is based on the case where the UE in the CELL_PCH state or the URA_PCH state carries a keepalive information indication in a cell update (CELL UPDATE) message or that the UE in the idle state carries a keepalive information indication in an RRC Connection Setup message. Then, the processes shown in 303 to 311 are performed. In this embodiment, whether to transmit the keepalive information is judged according to the traffic volume, and a corresponding optimization is performed according to the actual situation.

Figure 6:
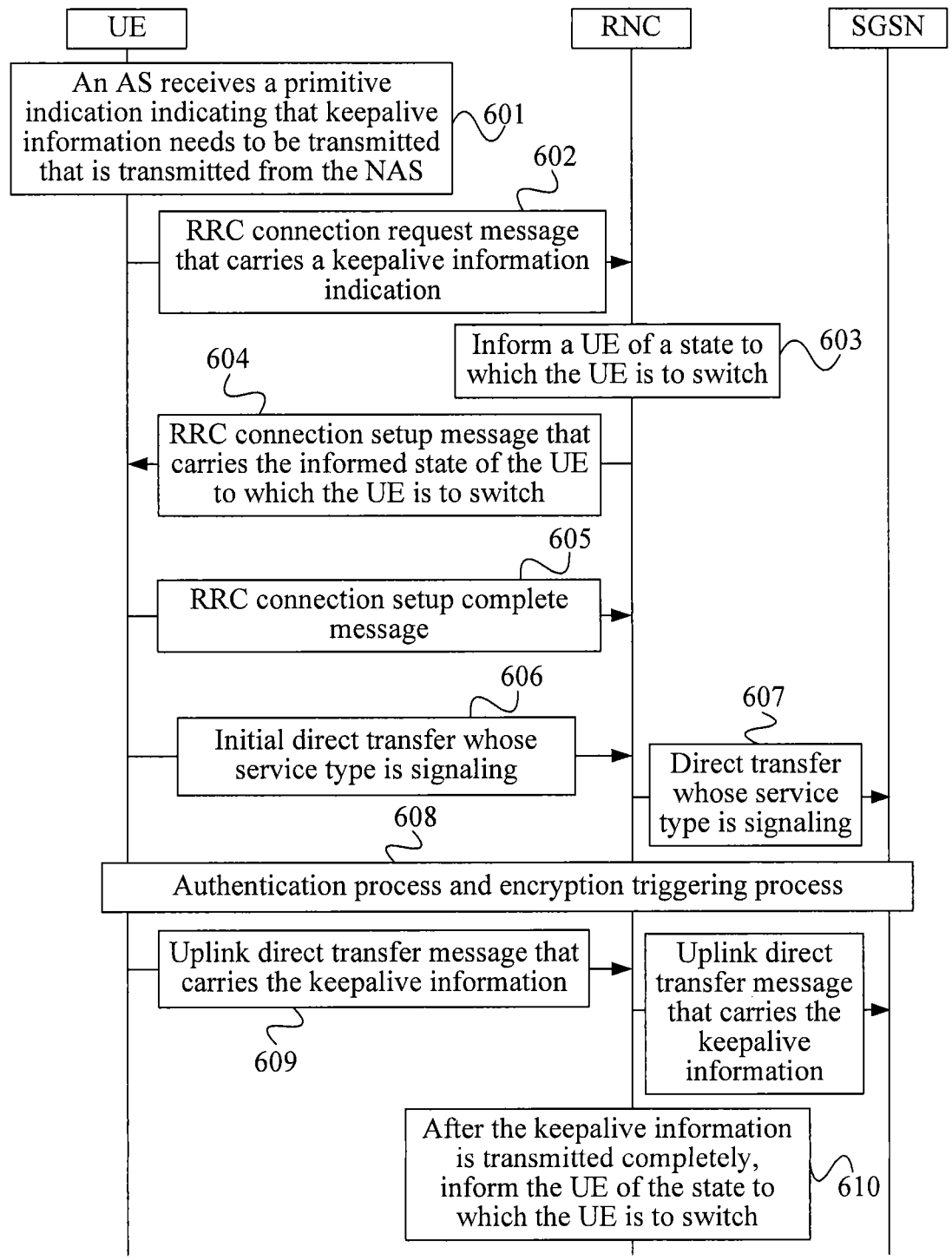
FIG. 6 is a schematic flow chart of a method for transmitting keepalive information according to another embodiment of the present invention.

Embodiments shown in FIG. 3 to FIG. 5 are based on the case where the keepalive information is transmitted in a service bearer. To further reduce signaling, the keepalive information may also be transmitted in signaling. In this case, no service bearer needs to be established. For example, details are as follows:

FIG. 6 is a schematic flow chart of a method for transmitting keepalive information according to another embodiment of the present invention. The method includes the following:

601: For a UE in the idle (IDLE) state, an access stratum of the UE receives a primitive indication transmitted from a non-access stratum of the UE, where the primitive indication indicates that keepalive information needs to be transmitted.

602: The UE initiates an RRC connection setup process, and transmits an RRC connection request (RRC CONNECTION REQUEST) message to an RRC, where the RRC connection request message carries a keepalive information indication.

603: After receiving the RRC Connection Request message, the RNC informs the UE of a state to which the UE is to switch.

604: The RNC carries the informed state to which the UE is to switch in an RRC connection setup (RRC CONNECTION SETUP) message, and transmits the RRC connection setup message to the UE.

605: The UE returns an RRC connection setup complete (RRC CONNECTION SETUP COMPLETE) message to the RNC.

The above 601 to 605 may be referred to 301 to 305.

It may be understood that the RRC connection request message in 602 may also not carry the keepalive information indication.

In addition, in this embodiment, the UE does not transmit the keepalive information indication to the RNC, or the UE transmits the traffic volume indication or the traffic volume measurement result to the RNC. Details may be referred to the above embodiments. Because a keepalive information indication may be transmitted as first information in subsequent steps in this embodiment, the keepalive information indication, traffic volume indication or traffic volume measurement result transmitted by the UE to the RNC in step 602 may be called second information.

606: The UE transmits an initial direct transfer (Initial Direct Transfer) message to the RNC.

For example, the initial direct transfer message includes a service request (SERVICE REQUEST) message, where the service type (service type) in the service request message is signaling (signaling).

607: The RNC transmits a direct transfer (Direct Transfer) message to an SGSN.

For example, the service type of the direct transfer message is signaling. In this way, after receiving the direct transfer message, the SGSN only initiates an authentication process and an encryption triggering process, and does not initiate an RAB assignment process.

608: The SGSN initiates an authentication process and an encryption triggering process.

609: The UE carries the keepalive information in an uplink direct transfer (UPLINK DIRECT TRANSFER) message, and transmits the uplink direct transfer message to the SGSN, where the uplink direct transfer message also carries the keepalive information indication used to indicate that the carried message is the keepalive information. For example, the keepalive information may be included in a NAS message part of the uplink direct Transfer message, and the keepalive information indication may be included in the "protocol discriminator" field of the NAS message part, for example, the "protocol discriminator" field is set to the keepalive message. After receiving the above uplink direct transfer message, the SGSN knows that the corresponding information is the keepalive information according to the keepalive information indication. Then, the SGSN forwards the keepalive information to a corresponding application server.

610: After the keepalive information is transmitted completely, the RNC instructs the UE to switch to a proper state.

It may be understood that this embodiment is based on the case where the UE in the IDLE state carries the keepalive information indication in the RRC connection setup message or that the UE in the CELL_PCH state or the URA_PCH/CELL_FACH state carries the keepalive information indication in the cell update message. Then, the process goes to 606 to 610. In particular, when the UE is in the CELL_PCH state or the URA_PCH state, the message carrying the service type in 606 is the UPLINK DIRECT TRANSFER message.

In this embodiment, the keepalive information is transmitted in signaling, and no service bearer needs to be established, which saves signaling loads of the Iu interface.

To further reduce signaling loads, the frequency of transmitting the keepalive information may be reduced. Details are as follows.

Figure 7:
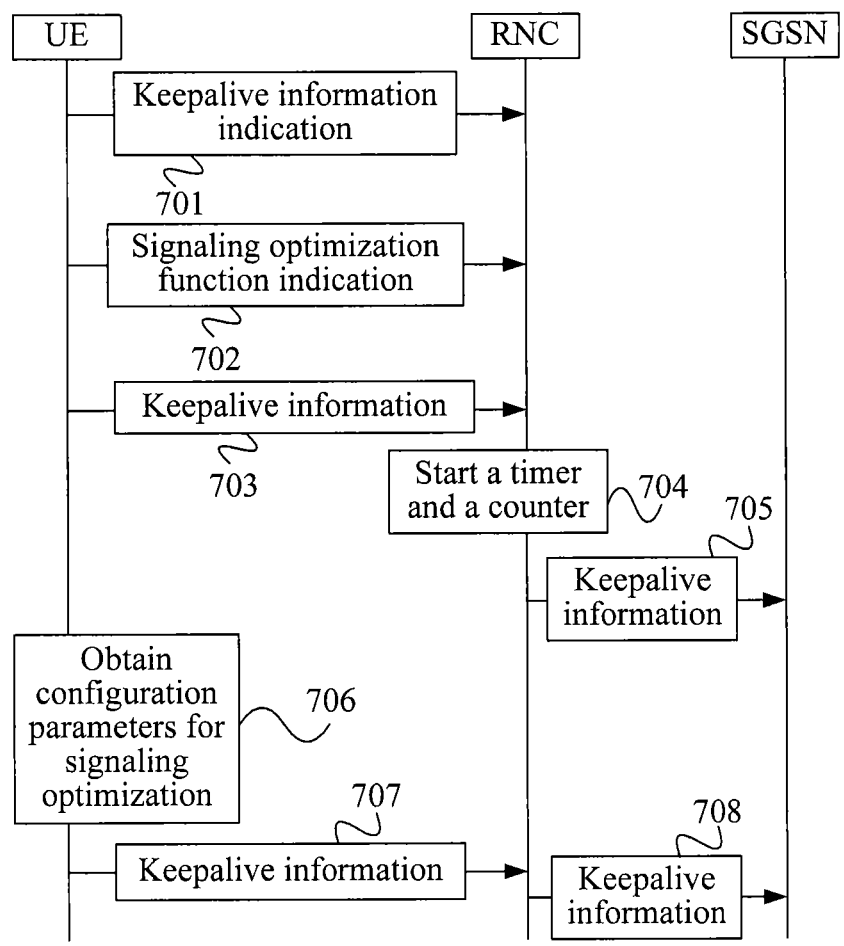
FIG. 7 is a schematic flow chart of a method for transmitting keepalive information according to another embodiment of the present invention.

FIG. 7 is a schematic flow chart of a method for transmitting keepalive information according to another embodiment of the present invention. The method includes the following:

701: A UE transmits a keepalive information indication to an RNC.

For example, the UE may determine to transmit keepalive information according to an indication of a non-access stratum, or the UE or the RNC determines to transmit the keepalive information according to the traffic volume. Details may be referred to the above embodiments.

The UE may transmit a keepalive information indication by using an RRC connection setup message or through a cell update message. Details may be referred to the above embodiment.

702: The UE transmits a signaling optimization function indication to the RNC.

For example, the signaling optimization function indication (Signaling Optimisation) is used to indicate whether the UE has a signaling optimization function. When the UE has a signaling optimization function, the frequency of transmitting the keepalive information may be reduced. For example, when the UE does not have the signaling optimization function, the UE transmits the keepalive information every one minute. When the UE has the signaling optimization function, the keepalive information may be transmitted every ten minutes.

The UE may carry the signaling optimization function indication in a piece of signaling from the UE to the RNC. For example, the signaling optimization function indication is carried in an RRC connection request (RRC CONNECTION REQUEST) message, an RRC connection setup complete (RRC CONNECTION SETUP COMPLETE) message or a UE capability information (UE CAPABLITY INFORMATION) message. Certainly, the signaling optimization function indication may also be carried in other messages.

703: The UE transmits the keepalive information to the RNC.

For example, the keepalive information may be transmitted over an established service bearer or by using signaling. Details may be referred to the above embodiment.

704: After the RNC receives the keepalive information transmitted from the UE, if both the UE and the RNC support a signaling optimization function, the RNC makes a duplicate of the keepalive information or forges a piece of keepalive information, and meanwhile starts a timer and a counter, and forwards the keepalive information to the SGSN.

705: After the duration of the timer expires, the RNC transmits the keepalive information to the SGSN.

706: The UE obtains configuration parameters for signaling optimization.

For example, the configuration parameters for signaling optimization may be the duration of the timer. For example, the RNC may instruct the UE to activate the signaling optimization function through dedicated signaling, for example, UTRAN MOBILITY INFORMATION, where the dedicated signaling may carry an activation indication or carry an activation indication and a timer for transmitting the keepalive information. The activation indication is used to activate the signaling optimization function of the UE, and the timer of the keepalive information is used to indicate the frequency of transmitting the keepalive information by the UE. For example, the timer may be set to 10 minutes, indicating that the UE needs to transmit the keepalive information every 10 minutes.

In another embodiment of the present invention, when the dedicated signaling includes only the activation indication and does not include the timer, the timer may be transmitted by using a broadcast message of the system or configured fixedly according to a protocol.

707: The UE transmits subsequent keepalive information according to the configuration parameters for signaling optimization.

For example, when the configuration parameters for signaling optimization indicate the 10-minute interval of transmitting the keepalive information, the UE transmits a piece of keepalive information to the RNC every ten minutes.

708: The RNC forwards keepalive information to the SGSN. Then, the SGSN forwards the keepalive information to an application server.

After successfully transmitting the keepalive information to the SGSN once, the RNC may initiate an RB release process based on an algorithm, but needs to maintain the Iu connection.

After the timer started by the RNC expires, the RNC transmits the keepalive information to the SGSN. If the RNC does not receive new keepalive information from the UE when the number of transmissions reaches the maximum number, the UE may already leave the RNC server or the UE may already quit the application program. In this case, the RNC initiates an Iu connection release process.

In this embodiment, the signaling optimization function is activated, which is capable of reducing the frequency of transmitting the keepalive information and further reducing signaling loads.

Figure 8:
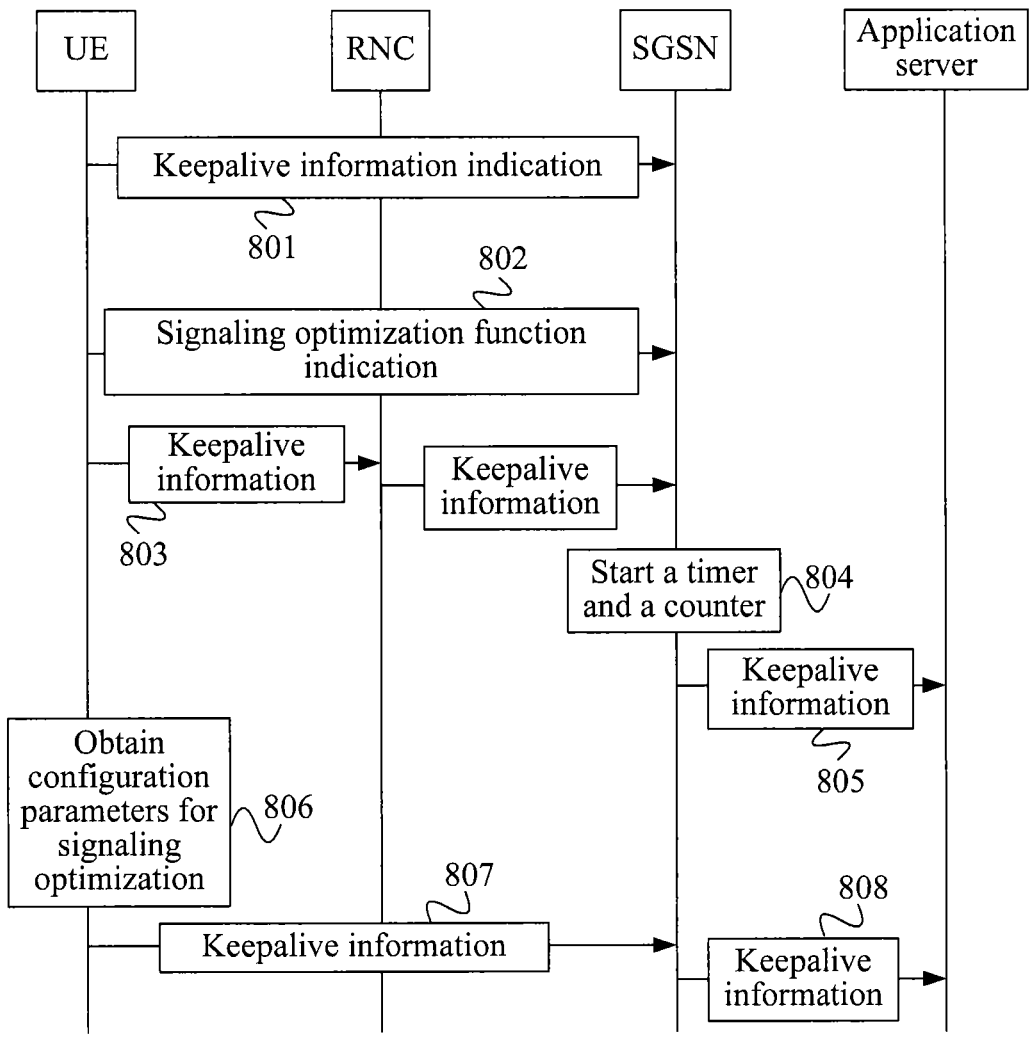
FIG. 8 is a schematic flow chart of a method for transmitting keepalive information according to another embodiment of the present invention.

FIG. 8 is a schematic flow chart of a method for transmitting keepalive information according to another embodiment of the present invention. The method includes the following:

801: A UE transmits a keepalive information indication to an SGSN.

For example, the UE may transmit a keepalive information indication to the RNC through the above AS message, for example, an RRC connection request (RRC CONNECTION REQUEST) message, and a cell update (CELL UPDATE) message. Then, the RNC forwards the indication to the SGSN by using a DIRECT INFORMATION TRANSFER message or other messages.

In another embodiment of the present invention, the UE transmits a keepalive information indication to the RNC by using A NAS layer message, for example, an initial direct transfer (Initial Direct Transfer) message. Then, the RNC carries the keepalive information indication in a direct transfer (DIRECT TRANSFER) message, and forwards the direct transfer message to the SGSN. This method is not limited to the above message.

802: The UE transmits a signaling optimization function indication to the SGSN.

For example, the UE may carry the signaling optimization function indication in a NAS message, and transmit the NAS message to the SGSN through the RNC.

In another embodiment of the present invention, the UE carries the signaling optimization function indication in an AS message, and transmits the AS message to the RNC; the RNC forwards the signaling optimization function indication to the SGSN, or the SGSN actively requests the signaling optimization function indication from the RNC.

803: The UE transmits the keepalive information to the SGSN.

804: After receiving the keepalive information transmitted from the UE, if the UE supports the signaling optimization function, the SGSN makes a duplicate of the keepalive information and starts a timer and a counter, and forwards the keepalive information to an application server.

805: After the duration of the timer expires, the SGSN transmits the keepalive information to the application server.

806: The UE obtains configuration parameters for signaling optimization. Details may be referred to 706.

807: The UE transmits subsequent keepalive information according to the configuration parameters for signaling optimization.

For example, when the configuration parameters for signaling optimization indicate a ten-minute interval at which the keepalive information is transmitted, the UE transmits the keepalive information to the SGSN every 10 minutes.

808: The SGSN forwards the keepalive information to the application server.

For example, when the timer started by the SGSN expires, the SGSN transmits the keepalive information to the application server. When the SGSN fails to receive new keepalive information from the UE after the number of transmissions reaches the maximum number, the UE already leaves the SGSN server or the UE already exits the application program. Then, the SGSN does not need to transmit the keepalive information to the application server. Corresponding to the Embodiment 7, in this embodiment, after the keepalive information is transmitted once, the Iu interface may be released to save Iu interface resources.

In this embodiment, the signaling optimization function is activated, which is capable of reducing the frequency of transmitting the keepalive information and further reducing signaling loads.

The above embodiments are based on the case where the CN network element is the SGSN and are applicable to the case where the CN network element is a GGSN.

Figure 9:
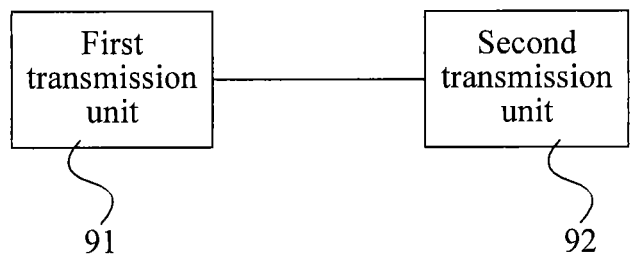
FIG. 9 is a schematic structural diagram of a UE according to another embodiment of the present invention.

FIG. 9 is a schematic structural diagram of a UE according to another embodiment of the present invention. The UE includes a first transmission unit 91 and a second transmission unit 92. The first transmission unit 91 is configured to transmit first information to a network device, where the first information is used to instruct the network device to determine keepalive information to be received. The second transmission unit 92 is configured to transmit keepalive information to the network device, where the network device is configured to optimize the keepalive information.

In another embodiment of the present invention, the first information is a keepalive information indication. When the first information is transmitted before the keepalive information, the terminal further includes: an access stratum unit, configured to receive a primitive indication transmitted from a non-access stratum, where the primitive indication indicates that keepalive information needs to be transmitted; and the first transmission unit 91 is configured to transmit the keepalive information indication after receiving the primitive indication;

In another embodiment of the present invention, the first information is a traffic volume indication indicating keepalive information to be received by a network device. When the first information is transmitted before the keepalive information, the terminal further includes: a first receiving unit, configured to receive a traffic volume measurement and report criterion transmitted from the network device, where the traffic volume measurement and report criterion includes a first threshold and a second threshold; the first transmission unit 91 is specifically configured to transmit the traffic volume indication when the traffic volume measurement result ranges between the first threshold and the second threshold.

In another embodiment of the present invention, the first information is a traffic volume measurement result measured by the terminal. When the first information is transmitted before the keepalive information, the first transmission unit 91 is configured to transmit the traffic volume measurement result to the network device, and the network device is configured to determine keepalive information to be received when the traffic volume measurement result ranges between a preconfigured first threshold and second threshold.

In another embodiment of the present invention, the first information is a traffic volume measurement result measured by the terminal. When the first information is transmitted before the keepalive information, the terminal further includes: a second receiving unit, configured to receive a traffic volume measurement and report criterion transmitted from the network device, where the traffic volume measurement and report criterion includes a first threshold; the first transmission unit 91 is configured to: transmit the traffic volume measurement result to a network device when the traffic volume measurement result is greater than or equal to the first threshold, where the network device is configured to determine keepalive information to be received when the traffic volume measurement result is smaller than or equal to a preconfigured second threshold.

In another embodiment of the present invention, the terminal may further include a first establishment unit configured to establish a service bearer between the terminal and a network device. In this case, the second transmission unit 92 is configured to transmit the keepalive information to the network device through the service bearer.

In another embodiment of the present invention, the first information is a keepalive information indication. When the first information and the keepalive information are transmitted at the same time, the embodiment may further include a third transmission unit configured to transmit a service type to the network device, where the service type indicates that the keepalive information is carried in signaling. In this case, the second transmission unit 92 is configured to: carry the keepalive information indication and the keepalive information in a NAS message part of the signaling, and transmit the signaling to the network device.

In another embodiment of the present invention, the embodiment may further include a fourth transmission unit configured to transmit second information to the network device, where the second information is used to instruct the network device to determine keepalive information to be received, so that the network device performs optimization before receiving the keepalive information, where the second information is a keepalive information indication, a traffic volume indication, or a traffic volume measurement result.

In another embodiment of the present invention, the embodiment may further include an obtaining unit configured to obtain configuration parameters for signaling optimization preconfigured or delivered from a network device when having a capability of reducing the frequency of transmitting the keepalive information. In this case, the second transmission unit 92 is configured to transmit the keepalive information according to the transmission frequency indicated by the configuration parameters for signaling optimization.

In another embodiment of the present invention, when the configuration parameters for signaling optimization are delivered from the network device, the terminal may further include: a report unit, configured to report a signaling optimization function indication to the network device, where the signaling optimization function indication is used to indicate whether the terminal has a capability of reducing the frequency of transmitting the keepalive information; the obtaining unit is configured to receive the configuration parameters for signaling optimization that the network device delivers through dedicated signaling or a broadcast message when the network device knows, according to the signaling optimization function indication, that the terminal has the capability of reducing the frequency of transmitting the keepalive information.

Specific functions of the above terminal and each unit thereof may be referred to the contents of the methods provided in any embodiment shown in FIG. 1 to FIG. 8, and are not further described.

In this embodiment, first information is transmitted to a network device, and the network device may know that keep live information is to be transmitted according to the first information, so that the network device optimizes the keep live information.

Figure 10:
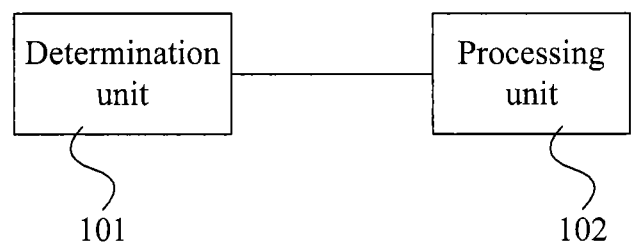
FIG. 10 is a schematic structural diagram of a network device according to another embodiment of the present invention.

FIG. 10 is a schematic structural diagram of a network device according to another embodiment of the present invention, where the network device includes a determination unit 101 and a processing unit 102. The determination unit 101 is configured to: receive first information transmitted from a terminal, and determine keepalive information to be received according to the first information. The processing unit 102 is configured to: receive keepalive information transmitted from the terminal, and optimize the keepalive information.

In another embodiment of the present invention, the processing unit 102 may include a first unit and/or a second unit. The first unit is configured to instruct the UE to enter a CELL_FACH state when signaling loads are heavy before the keepalive information is transmitted; the second unit is configured to instruct the UE to enter a CELL_PCH state or a URA_PCH state when signaling loads are heavy after the keepalive information is transmitted completely.

In another embodiment of the present invention, the first information is a traffic volume indication indicating keep live information to be received by a network device. When the first information is received before the keep live information, the network device further includes: a fifth transmission unit configured to transmit a traffic volume measurement and report criterion to the terminal, where the traffic volume measurement and report criterion includes a first threshold and a second threshold; when the traffic volume measurement result measured by the terminal ranges between the first threshold and the second threshold, the network device receives a traffic volume indication indicating keepalive information to be received by the network device transmitted from the terminal.

In another embodiment of the present invention, the first information is a traffic volume measurement result measured by the terminal. When the first information is received before the keep live information, a first threshold and a second threshold are preconfigured on the network device, and the determination unit 101 includes: a third unit and a fourth unit. The third unit is configured to receive the traffic volume measurement result transmitted from the terminal; and the fourth unit is configured to determine keep live information to be received when the traffic volume measurement result ranges between the first threshold and the second threshold.

In another embodiment of the present invention, the first information may be a traffic volume measurement result measured by the terminal. When the first information is received before the keepalive information, the network device further includes: a sixth transmission unit configured to transmit a traffic volume measurement and report criterion to the terminal, where the traffic volume measurement and report criterion includes a first threshold; when the traffic volume measurement result is greater than or equal to the first threshold, the network device receives a traffic volume measurement result transmitted from the terminal; and when the traffic volume measurement result is smaller than or equal to a second threshold preconfigured by the network device, the network device determines keepalive information to be received.

In another embodiment of the present invention, the first information is a keep live information indication. The determination unit 101 is configured to receive a keep live information indication transmitted from the terminal, where the keep live information indication is transmitted after an access stratum of the terminal receives from a non-access stratum a primitive indication indicating that keep live information needs to be transmitted.

In another embodiment of the present invention, the network device may further include a second establishment unit configured to establish a service bearer between the terminal and a network device; the processing unit 102 is configured to: receive keepalive information transmitted from the terminal through the service bearer, and optimize the keepalive information.

In another embodiment of the present invention, the first information is a keepalive information indication, and the first information and the keepalive information are received at the same time. The network device provided in this embodiment may further include a third receiving unit configured to receive a service type transmitted from the terminal, where the service type indicates that the keepalive information is carried in signaling for transmission; the processing unit 102 is configured to receive the keepalive information indication and the keepalive information carried by the terminal in the NAS message part of the signaling.

In another embodiment of the present invention, the network device may further include a fourth receiving unit configured to: receive second information transmitted from the terminal, determine keepalive information to be received according to the second information, and perform optimization processing before receiving the keepalive information, where the second information is a keepalive information indication, a traffic volume indication, or a traffic volume measurement result.

In another embodiment of the present invention, the network device may further include a fifth receiving unit and a seventh transmission unit. The fifth receiving unit is configured to receive a signaling optimization function indication transmitted from the terminal, where the signaling optimization function indication is used to indicate whether the terminal has a capability of reducing the frequency of transmitting the keepalive information. The seventh transmission unit is configured to transmit configuration parameters for signaling optimization to the UE when the UE has a capability of reducing the frequency of transmitting the keepalive information, so that the UE transmits keepalive information according to the configuration parameters for signaling optimization.

Specific functions of the above network device and each unit thereof may be referred to the contents of the methods provided in any embodiment shown in FIG. 1 to FIG. 8, and are not further described.

In this embodiment, first information is received, and the network device may know that keep live information is transmitted according to the first information, so that the network device optimizes the keep live information.

Figure 11:
FIG. 11 is a schematic structural diagram of a system for transmitting keepalive information according to another embodiment of the present invention.

FIG. 11 is a schematic structural diagram of a system for transmitting keepalive information according to another embodiment of the present invention. The system includes a terminal 111 and a network device 112. The terminal 111 is shown in FIG. 9, and the network device 112 is shown in FIG. 10.

In this embodiment, first information is received, and the network device may know that keep live information is transmitted according to the first information, so that the network device optimizes the keep live information.

Those skilled in the art may understand that all or part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be a ROM, a RAM, a magnetic disk or an optical disk.

It should be noted that the above embodiments are merely provided for elaborating the technical solutions of the present invention, but not intended to limit the present invention. Although the present invention has been described in detail with reference to the foregoing embodiments, it is apparent that those skilled in the art may make various modifications and variations to the invention without departing from the spirit and scope of the invention. The invention shall cover the modifications and variations provided that they fall in the scope of protection defined by the following claims or their equivalents.

What is claimed is:

1. A method for transmitting keepalive information, comprising:

transmitting, by a terminal, first information to a network device, wherein the first information is used to instruct the network device to determine keepalive information to be received;

transmitting, by the terminal, the keepalive information to the network device, wherein the network device is configured to optimize the keepalive information by reducing signal loads between the terminal and the network device, and when the terminal has the capability of reducing the frequency of transmitting the keepalive information, obtaining, by the terminal, configuration parameters for signaling optimization preconfigured or delivered by the network device, wherein the keepalive information is duplicated and forwarded by the network device according to a timer and a counter, wherein the configuration parameters include duration of the timer, and wherein the transmitting keepalive information includes transmitting the keepalive information according to a transmission frequency indicated by the configuration parameters for signaling optimization.

2. The method according to claim 1, wherein:

the first information is a keepalive information indication; when the first information is transmitted before the keepalive information is transmitted, before transmitting the first information, the method further comprises: receiving, by an access stratum of the terminal, a primitive indication transmitted from a non-access stratum, wherein the primitive indication indicates that the keepalive information needs to be transmitted, so that the keepalive information indication is transmitted; or, the first information is a traffic volume indication indicating keepalive information to be received by the network device; and when the first information is transmitted before the keepalive information, before transmitting the first information, the method further comprises: receiving, by the terminal, a traffic volume measurement and report criterion transmitted from the network device, wherein the traffic volume measurement and report criterion comprises a first threshold and a second threshold, so that the traffic volume indication is transmitted when a traffic volume measurement result ranges between the first threshold and the second threshold; or, the first information is a traffic volume measurement result measured by the terminal; and when the first information is transmitted before the keepalive information, the transmitting, by the terminal, first information to a network device, wherein the first information is used to instruct the network device to determine keepalive information to be received comprises: transmitting, by the terminal, the traffic volume measurement result to the network device, wherein the network device is configured to determine the keepalive information to be received when the traffic volume measurement result ranges between a preconfigured first threshold and second threshold; or, the first information is a traffic volume measurement result measured by the terminal; and when the first information is transmitted before the keepalive information, before transmitting the first information, the method further comprises: receiving, by the terminal, a traffic volume measurement and report criterion transmitted from the network device, wherein the traffic volume measurement and report criterion comprises a first threshold; the transmitting, by the terminal, first information to a network device, wherein the first information is used to instruct the network device to determine keepalive information to be received comprises: when the traffic volume measurement result is greater than or equal to the first threshold, transmitting, by the terminal, the traffic volume measurement result to the network device, wherein the network device is configured to determine the keepalive information to be received when the traffic volume measurement result is smaller than or equal to a preconfigured second threshold.

3. The method according to claim 1, wherein:
the first information is carried in a radio resource control (RRC) connection setup request message;
or,
the first information is carried in a cell update message.

4. The method according to claim 2, wherein the traffic volume measurement and report criterion is carried in a first SIB message, a second SIB message, a third SIB message, or a measurement control message.

5. The method according to claim 1, wherein:
the first information is a keepalive information indication, and the first information and the keepalive information are transmitted at the same time;
before transmitting keepalive information to the network device, the method further comprises:

transmitting, by the terminal, a service type to the network device, wherein the service type indicates that the keepalive information is carried in signaling for transmission; and
the transmitting the first information to the network device and the transmitting the keepalive information to the network device comprise: carrying the keepalive information indication and the keepalive information in a non-access stratum (NAS) message part of the signaling, and transmitting the signaling to the network device.

6. The method according to claim 5, wherein before transmitting the keepalive information to the network device, the method further comprises:
transmitting, by the terminal, second information to the network device, wherein the second information is used to instruct the network device to determine keepalive information to be received, so that the network device performs optimization before receiving the keepalive information, and the second information is a keepalive information indication, a traffic volume indication, or a traffic volume measurement result.

7. The method according to claim 1, wherein when the configuration parameters for signaling optimization are delivered by the network device, the method further comprises:
reporting, by the terminal, a signaling optimization function indication to the network device, wherein the signaling optimization function indication is used to indicate whether the terminal has a capability of reducing the frequency of transmitting the keepalive information, so that the network device delivers the configuration parameters for signaling optimization by using dedicated signaling or a broadcast message when the network device knows, according to the signaling optimization function indication, that the terminal has a capability of reducing the frequency of transmitting the keepalive information.

8. The method according to claim 7, wherein the signaling optimization function indication is carried in an RRC connection request message, an RRC connection setup complete message or a user equipment (UE) capability information message.

9. A method for transmitting keepalive information, comprising:
receiving, by a network device, first information transmitted from a terminal, and determining keepalive information to be received according to the first information;
receiving, by the network device, keepalive information transmitted from the terminal, and optimizing the keepalive information by reducing signal loads between the terminal and the network device, and
receiving, by the network device, a signaling optimization function indication transmitted from the terminal, wherein the signaling optimization function indication is used to indicate whether the terminal has a capability of reducing the frequency of transmitting the keepalive information; and
when the terminal has the capability of reducing the frequency of transmitting the keepalive information, transmitting, by the network device, configuration parameters for signaling optimization to the terminal,
wherein the keepalive information is duplicated and forwarded by the network device according to a timer and a counter,
wherein the configuration parameters include duration of the timer, and wherein the terminal transmits the keepalive information according to the configuration parameters for signaling optimization.

10. The method according to claim 9, wherein:
the first information is a traffic volume indication indicating the keepalive information to be received by the network device; when the first information is received before the keepalive information, the method further comprises: transmitting, by the network device, a traffic volume measurement and report criterion to the terminal, wherein the traffic volume measurement and report criterion comprises a first threshold and a second threshold; the receiving, by the network device, first information transmitted from the terminal, and determining keepalive information to be received according to the first information comprise: when a traffic volume measurement result measured by the terminal ranges between the first threshold and the second threshold, receiving, by the network device, a traffic volume indication indicating keepalive information to be received by the network device transmitted from the terminal;

or, the first information is a traffic volume measurement result measured by the terminal, a first threshold and a second threshold are preconfigured on the network device; when the first information is received before the keepalive information, the receiving, by the network device, first information transmitted from the terminal and determining keepalive information to be received according to the first information comprise: receiving, by the network device, the traffic volume measurement result transmitted from the terminal; when the traffic volume measurement result ranges between the first threshold and the second threshold, determining keepalive information to be received;

or, the first information is a traffic volume measurement result measured by the terminal; when the first information is received before the keepalive information, the method further comprises:

transmitting, by the network device, a traffic volume measurement and report criterion to the terminal, wherein the traffic volume measurement and report criterion comprises a first threshold;

the receiving, by the network device, first information transmitted from a terminal and determining keepalive information to be received according to the first information comprise: when the traffic volume measurement result is greater than or equal to the first threshold, transmitting, by the network device, a traffic volume measurement result transmitted from the terminal; when the traffic volume measurement result is smaller than or equal to a second threshold preconfigured by the network device, determining keepalive information to be received; or, the first information is a keepalive information indication; when the first information is received before the keepalive information, the receiving first information comprises: receiving a keepalive information indication transmitted from a terminal, wherein the keepalive information indication is transmitted after an access stratum of the terminal receives from a non-access stratum a primitive indication indicating that keepalive information needs to be transmitted.

11. The method according to claim 9, wherein:
the first information is a keepalive information indication, and the first information and the keepalive information are received at the same time;

the method further comprises: receiving, by a network device, a service type transmitted from a terminal, wherein the service type indicates that the keepalive information is carried in signaling for transmission; and the receiving first information transmitted from the terminal and receiving keepalive information transmitted from the terminal comprise: receiving the keepalive information indication and the keepalive information carried by the terminal in a NAS message part of the signaling.

12. The method according to claim 11, wherein before receiving the keepalive information transmitted from the terminal, the method further comprises:

receiving second information transmitted from the terminal, determining keepalive information to be received according to the second information, and performing optimization before receiving the keepalive information, and the second information is a keepalive information indication, a traffic volume indication, or a traffic volume measurement result.

13. A terminal, comprising:
a first transmitter, configured to transmit first information to a network device, wherein the first information is used to instruct the network device to determine keepalive information to be received;
a second transmitter, configured to transmit keepalive information to the network device, wherein the network device is configured to optimize the keepalive information by reducing signal loads between the terminal and the network device, and
a processor, wherein the processor is specially configured to obtain configuration parameters for signaling optimization preconfigured or delivered by the network device when having a capability of reducing the frequency of transmitting the keepalive information,
wherein the keepalive information is duplicated and forwarded by the network device according to a timer and a counter,
wherein the configuration parameters include duration of the timer, and
wherein the second transmitter is specially configured to transmit keepalive information according to a transmission frequency indicated by the configuration parameters for signaling optimization.

14. The terminal according to claim 13, wherein:
the first information is a keepalive information indication; when the first information is transmitted before the keepalive information is transmitted, the processor is configured to receive a primitive indication transmitted from a non-access stratum, wherein the primitive indication indicates that the keepalive information needs to be transmitted; and the first transmitter is configured to transmit the keepalive information indication after receiving the primitive indication;

or, the first information is a traffic volume indication indicating keepalive information to be received by a network device; when the first information is transmitted before the keepalive information, the terminal further comprises: a first receiver, configured to receive a traffic volume measurement and report criterion transmitted from the network device, wherein the traffic volume measurement and report criterion comprises a first threshold and a second threshold; and the first transmitter is configured to transmit the traffic volume indication when the traffic volume measurement result ranges between the first threshold and the second threshold;

or,
the first information is a traffic volume measurement result measured by the terminal; when the first information is transmitted before the keepalive information is transmitted, the first transmitter is configured to transmit the traffic volume measurement result to the network device, the network device is configured to determine keepalive information to be received when the traffic volume measurement result ranges between a preconfigured first threshold and second threshold;

or,
the first information is a traffic volume measurement result measured by the terminal; when the first information is transmitted before the keepalive information, the terminal further comprises: a second receiver, configured to receive a traffic volume measurement and report criterion transmitted from the network device, wherein the traffic volume measurement and report criterion comprises a first threshold; the first transmitter is configured to transmit the traffic volume measurement result to the network device when the traffic volume measurement result is greater than or equal to the first threshold; and determine the keepalive information to be received when the traffic volume measurement result is smaller than or equal to a preconfigured second threshold.

15. The terminal according to claim 13, wherein the first information is a keepalive information indication; and when the first information and the keepalive information are transmitted at the same time, the terminal further comprises:
  a third transmitter, configured to transmit a service type to the network device, wherein the service type indicates that the keepalive information is carried in signaling for transmission; wherein
  the second transmitter is configured to carry the keepalive information indication and the keepalive information in a NAS message part of the signaling, and transmit the signaling to the network device.

16. The terminal according to claim 15, further comprising:
  a fourth transmitter, configured to transmit second information to the network device, wherein the second information is used to instruct the network device to determine the keepalive information to be received, so that the network device performs optimization before receiving the keepalive information, and the second information is a keepalive information indication, a traffic volume indication, or a traffic volume measurement result.

17. The terminal according to claim 16, wherein when the configuration parameters for signaling optimization are delivered by the network device,
  the processor is specially configured to report a signaling optimization function indication to the network device, wherein the signaling optimization function indication is used to indicate whether the terminal has a capability of reducing the frequency of transmitting the keepalive information; and
  configured to receive configuration parameters for signaling optimization delivered by the network device using dedicated signaling or a broadcast message when knowing, according to the signaling optimization function indication, that the terminal has the capability of reducing the frequency of transmitting the keepalive information.

18. A network device, comprising:
a receiver, configured to receive first information and keepalive information transmitted from a terminal; and
a processor, configured to determine keepalive information to be received according to the first information and optimize the keepalive information by reducing signal loads between the terminal and the network device,
wherein the receiver is further configured to receive a signaling optimization function indication transmitted from the terminal, wherein the signaling optimization function indication is used to indicate whether the terminal has a capability of reducing the frequency of transmitting the keepalive information,
wherein the network device further comprises a transmitter, configured to transmit configuration parameters for signaling optimization to the terminal when the terminal has the capability of reducing the frequency of transmitting the keepalive information,
wherein the keepalive information is duplicated and forwarded by the network device according to a timer and a counter,
wherein the configuration parameters include duration of the timer, and
wherein the terminal transmits the keepalive information according to the configuration parameters for signaling optimization.

19. The network device according to claim 18, wherein:
the first information is a traffic volume indication indicating keepalive information to be received by a network device; when the first information is received before the keepalive information, the network device further comprises: a transmitter, configured to transmit a traffic volume measurement and report criterion to the terminal, wherein the traffic volume measurement and report criterion comprises a first threshold and a second threshold; the network device receives a traffic volume indication indicating keepalive information to be received by the network device transmitted by the terminal when the processor determines that the traffic volume measurement result measured by the terminal ranges between the first threshold and the second threshold;

or,
the first information is a traffic volume measurement result measured by the terminal; when the first information is received before the keepalive information, a first threshold and a second threshold are preconfigured on the network device, and the processor is specially configured to receive the traffic volume measurement result transmitted from the terminal and determine keepalive information to be received when the traffic volume measurement result ranges between the first threshold and the second threshold;

or,
the first information is a traffic volume measurement result measured by the terminal; when the first information is received before the keepalive information, the network device further comprises: a transmitter, configured to transmit a traffic volume measurement and report criterion to the terminal, wherein the traffic volume measurement and report criterion comprises a first threshold; the network device receives the traffic volume measurement result transmitted from the terminal when the processor determines that the traffic volume measurement result is greater than or equal to the first threshold; and determines keepalive information to be received when the traffic volume measurement result is smaller than or equal to a second threshold preconfigured by the network device;

or, the first information is a keepalive information indication, and the processor is specially configured to receive a keepalive information indication transmitted from the terminal, wherein the keepalive information indication is transmitted after an access stratum of the terminal receives from a non-access stratum a primitive indication indicating that the keepalive information needs to be transmitted.

20. The network device according to claim 18, wherein the first information is a keepalive information indication; when the first information and the keepalive information are received at the same time, the receiver is further configured to receive a service type transmitted from the terminal, wherein the service type indicates that the keepalive information is carried in signaling for transmission; and the processor is further configured to receive the keepalive information indication and the keepalive information carried by the terminal in a NAS message part of signaling.

21. The network device according to claim 20, wherein the receiver is further configured to receive second information transmitted from the terminal, determine keepalive information to be received according to the second information, and perform optimization processing before receiving the keepalive information, wherein the second information is a keepalive information indication, a traffic volume indication, or a traffic volume measurement result.

\* \* \* \* \*